Nov. 3, 1931.  A. M. ROSSMAN  1,830,485
SYSTEM OF ADJUSTABLE SPEED CONTROL FOR ALTERNATING CURRENT MOTORS
Filed April 21, 1930  2 Sheets-Sheet 1
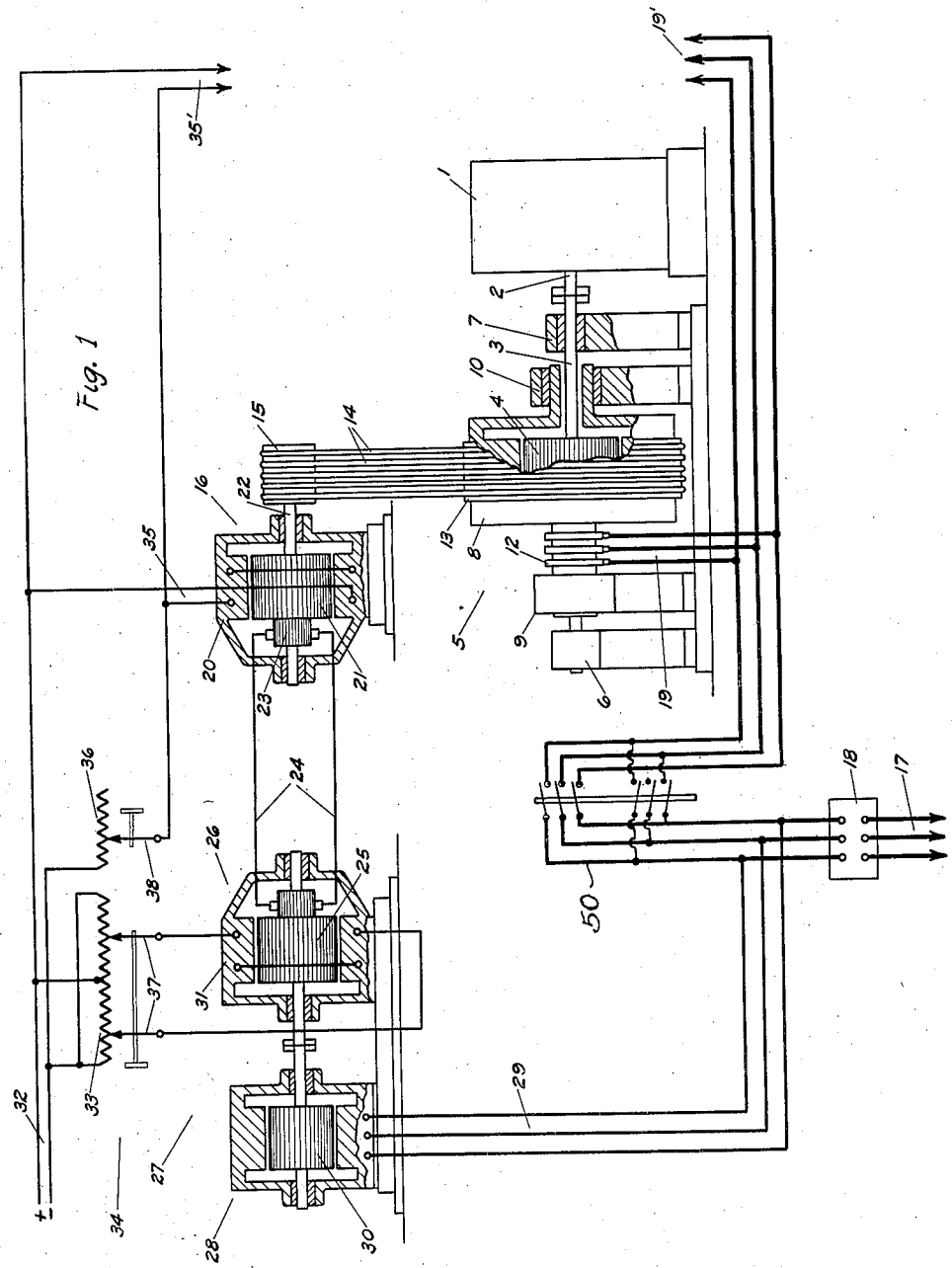

Nov. 3, 1931.    A. M. ROSSMAN    1,830,485
SYSTEM OF ADJUSTABLE SPEED CONTROL FOR ALTERNATING CURRENT MOTORS
Filed April 21, 1930    2 Sheets-Sheet 2
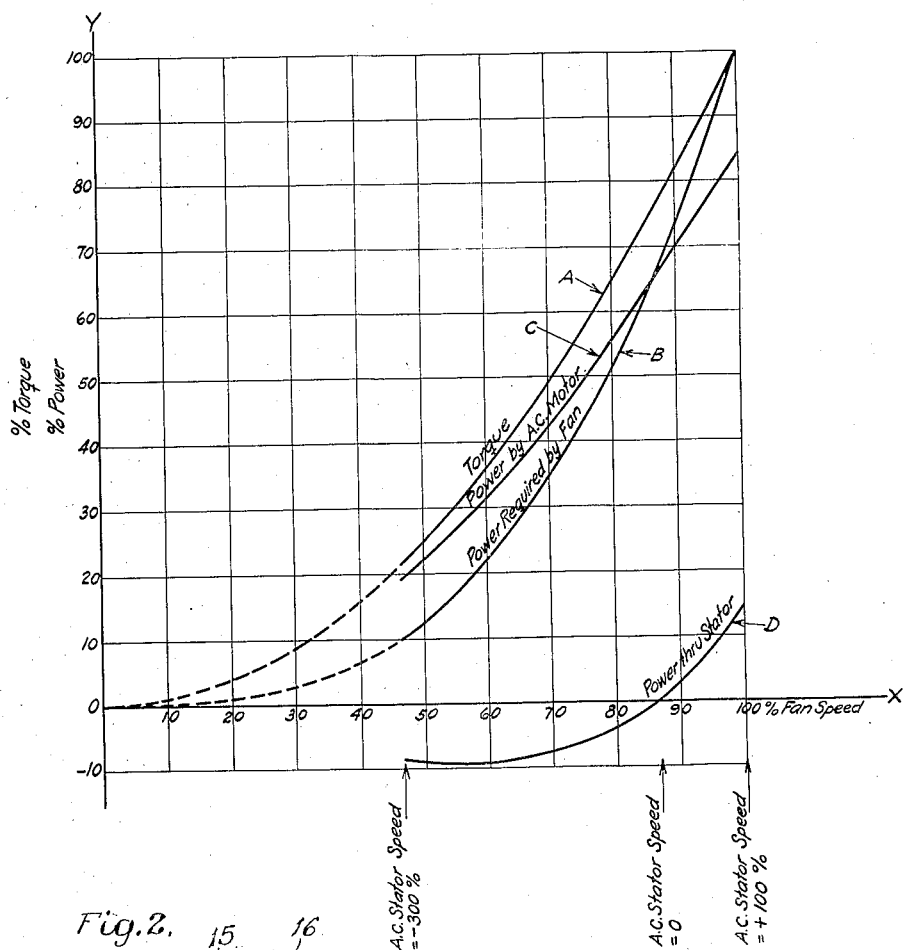
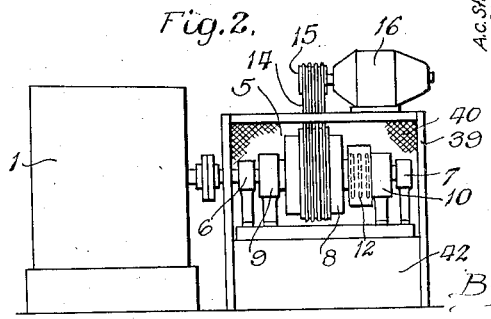
Inventor:
Allen M. Rossman Patented Nov. 3, 1931

1,830,485

UNITED STATES PATENT OFFICE

ALLEN M. ROSSMAN, OF WILMETTE, ILLINOIS, ASSIGNOR TO ROSSMAN PATENTS INC., OF CHICAGO, ILLINOIS, A CORPORATION OF ILLINOIS

SYSTEM OF ADJUSTABLE SPEED CONTROL FOR ALTERNATING CURRENT MOTORS

Application filed April 21, 1930. Serial No. 445,902.

My present invention relates to a system of developing power at variable speed from alternating current of constant frequency. More specifically, it provides a system of regulating the speed of alternating current motors of fixed speed characteristics. The present invention constitutes an improvement upon the system disclosed in my co-pending application, Serial No. 275,641, filed May 7, 1928. The said co-pending application is directed broadly to the drive system consisting of a main alternating current motor connected differentially between a load shaft and an auxiliary D. C. motor, which in turn is coupled back to the A. C. mains for interchange of power. The present application is directed to an improvement in the coupling of the main alternating current motor and the auxiliary D. C. motor.

The system of speed control of the present invention is efficient over a wide range of speeds, has good speed regulation characteristics and, in the preferred form, utilizes a combination of the simplest types of electrical machines.

The theory of the drive is based upon the use of a main A. C. motor of constant speed type for developing the main part of the motion and power required for the drive and the use of an auxiliary, adjustable speed direct current machine for altering, by addition or subtraction of motion, the speed of the main motor.

The auxiliary D. C. machine is a reversible power translating device connected, on its electrical side, preferably with the same source of alternating current as that supplying the main motor, through a controllable translating device governing the speed and direction of the auxiliary D. C. machine.

This device is preferably a motor generator set, the generator voltage of which is controllable in direction as well as value by a manually controllable rheostat. On the mechanical side the auxiliary D. C. machine is connected either through a ratio changing transmission or directly, in differential relation to the main motor and to the load, so that the torque of the load is imposed differentially upon both the main and the auxiliary motor, equally, or inversely in proportion to the mechanical advantage which one motor has over the other.

The present system is advantageous in efficiency and simplicity. Substantially standard machines may be employed. The main unit is preferably a squirrel cage motor which is inherently of marked simplicity and ruggedness.

For traction work, or for a load which may have negative torque characteristics, the drive provides a system of regenerative braking throughout the entire range of speeds.

The main A. C. motor and the auxiliary motor are both constant speed type machines and therefore the drive is of constant speed type, holding substantially a fixed speed for any setting, over a wide range of torques.

The drive will hold substantially fixed speeds for definite positions of the controller rheostat and changing the setting of the controller definitely changes the speed and/or direction of rotation of the drive.

The particular improvements which the present construction effects with respect to the said prior application are:

(1) Better mechanical embodiment of the drive unit.

(2) A more compact and efficient arrangement of the A. C. and D. C. elements of the drive unit.

(3) Higher over-all efficiencies.

(4) Reduced first cost.

While I shall describe the drive as applied to a fan, or centrifugal pump, it is not intended to be limited to such particular use, but as will appear later, certain advantages accrue to the drive when employed in connection with a load the torque of which is an exponential function of the speed, or such a load where the ratio of torque to speed decreases markedly as the speed decreases.

The preferred embodiment of my invention involves the use of a flexible band drive, providing a suitable mechanical advantage for the D. C. machine over the A. C. motor of the drive unit. However, the mechanical advantage may be otherwise secured.

While the preferred embodiment relates to the driving of stationary machinery it is to be understood that the invention may be applied to the driving of rolling, or live loads, such as railway or automotive use, or to the propulsion of ships and the like.

Now, in order to acquaint those skilled in the art with the manner of constructing and operating a device embodying my invention I shall describe in connection with the accompanying drawings, a specific embodiment of the same. In the drawings like reference numerals refer to like parts, throughout.

Figure 1 is a diagram of one form of my invention showing the drive unit and the regulating unit;

Figure 2 is a side elevational view of the drive unit shown in Figure 1; and

Figure 3 is a chart of characteristic curves for explaining the operation of the drive in connection with certain types of load.

Referring to the embodiment of Figures 1 and 2, the load 1 herein shown is a fan, such as may be employed either as an induced draft fan or as a forced draft fan, for a furnace or the like. The characteristic of the load 1 is indicated by the curve A on Figure 3, which curve indicates the relation between torque and speed of the fan. It will be observed that the torque rises substantially as the square of the speed, or at least as an exponential function of the speed.

The shaft 2 of the fan 1 is coupled to the shaft 3 of the rotor 4 of the squirrel cage A. C. motor 5. This motor 5 has the rotor 4 mounted on the shaft 3, the shaft being supported in suitable stationary bearings 6 and 7, and comprises the case 8. which is revolvably mounted in bearings 9 and 10. Thus the two elements of the squirrel cage motor 5 are mounted for independent rotation. The shaft 3 preferably passes loosely through the hollow axle on the case 8, which hollow axle is mounted in the bearings 9 and 10. The case 8 is provided with suitable windings, supplied with alternating current through the slip rings 12. The case 8 has a generally cylindrical exterior surface which forms a driving pulley 13 provided with a series of V-shaped grooves for receiving the V-belts 14.

These belts 14 are preferably made of a composite fabric and rubber, and this drive, employing a plurality of such semi-elastic V-belts and a pair of pulleys, is marketed under the trade name of "Tex-Rope". There are certain advantages in this form of drive which make it peculiarly suitable for my system. Among such advantages are saving in floor space, freedom from requirement for lubrication, elimination of gear cases, permissible locations of centers for any selected drive ratio. High efficiency and quietness are also attained at low expense. A further peculiar advantage of this form of connection resides in the ability to hold the parts, such as the sheave 15 and the casing 8 under full torque at low or zero speed without danger of slippage such as would be encountered in the case of flat belts. These V-belts 14 pass over a pulley 15 of the auxiliary D. C. machine 16, the pulley 15 being of a smaller diameter than the pulley 13 in order to give the motor 16 a suitable mechanical advantage over the A. C. motor 5.

Alternating current from the mains 17 is supplied through a circuit breaker 18 and through a pole-changer or reversing switch 50 to the slip rings 12 over the leads 19.

The auxiliary D. C. machine 16 is a separately excited D. C. motor having the field frame 20 and armature 21 mounted on a suitable shaft 22, provided with bearings in the field frame.

The armature 21 has a commutator 23 which is supplied with current of constant direction but variable voltage through a closed circuit 24 which includes the armature 25 of the generator 26 of the regulating unit 27. The regulating unit 27 comprises an A. C. motor 28 driving the D. C. generator 26.

The A. C. motor 28 is preferably a squirrel cage motor supplied with current from the main 17 through the leads 29. The shaft of the rotor 30 is preferably direct connected to the shaft of the armature 25 of the machine 26. The field 31 is separately excited from the constant potential direct current mains 32 through a potentiometer type of rheostat 33, forming a part of the controller 34, for varying the potential and polarity impressed upon the separately excited field 31.

The field 20 of the auxiliary direct current machine 16 is excited through the leads 35 which are connected to the D. C. mains 32 through the rheostat 36 which forms a part of the controller 34. The controller 34 comprises the contacts 37 cooperating with the rheostat 33 for varying the polarity and potential impressed upon the field 31 to secure a part of the range of variation of speed of the drive and comprises also the contact 38, cooperating with the rheostat 36 for changing the field excitation of the D. C. auxiliary motor 16, for the purpose, as will be described in detail later, of controlling the lower end of the speed range so as to extend the percentage speed variation of the drive.

The regulating unit 27 may control more than one drive unit, and I have indicated the leads 19' and 35' for connection with a second drive, the leads 19' being connected to the A. C. motor of the second drive unit and the leads 35' being connected to the field of the auxiliary D. C. machine for the second drive unit, the armature of which D. C. machine of the second drive unit is connected in series with the armature 25 and in parallel with the armature 21. This feature of control of a plurality of drives from a common controller is not claimed herein.

Referring to Figure 2, a suitable framework, which may be made of structural steel parts, indicated at 39, surrounds the A. C. motor 5 and at the same time provides a support for the auxiliary D. C. machine 16, which is thereby mounted above the A. C. motor 5.

The steel framework 39 is preferably enclosed by means of a metallic screen 40 or the like, preventing accidental contact with the moving parts of the machine but permitting freely the passage of air for ventilation and cooling of the main A. C. motor 5. The controlling unit 27 may be located at any suitable point since the only connection is electrical. A suitable foundation 42 is provided for the motor 5 to bring its shaft in suitable relation to the load device 1. The frame work 39 is preferably connected to the foundation or base 42, so that the motor 16 is rigid with the motor 5.

The operation of the system is as follows:

Alternating current is supplied to the main motor 5 and to the motor 28 of the motor generator set 27. The motor generator set operates at substantially constant speed, driving the armature 25 of the generator 26 to create a generated voltage in said armature 25 which, for direction and value is a function of the polarity and potential impressed upon the field 31. It is to be observed, however, that the generated polarity in the armature 25 does not control the direction of current flow through the leads 24, which is not varied. That is to say, the direction of current flow in the leads 24 does not change, except as the torque changes direction and the rate of current flow is proportional to torque.

Energization of the windings of the main A. C. motor 5 results in relative motion between the case 8 and the rotor 4. This relative motion between the parts 8 and 4 is substantially fixed. The speed of the shaft 3 is controlled, however, by controlling the direction and rate of motion of the case 8. If the case 8 is driven forward in the same direction as the direction of motion of the rotor 4, then the speeds of the case and the rotor are additive to raise the speed of the shaft 3. If the case 8 is rotated backward, that is, in the opposite direction with respect to the direction of rotation of the rotor 4, the speeds are subtractive, thereby reducing the speed of the shaft 3. Assume that the field excitation of the auxiliary machine 16 is held at a fixed value and a predetermined potential is impressed upon the armature 21, a fixed speed of said armature 21 will be maintained.

It is to be observed that the torque of the shaft 3 determines the torque between the elements 4 and 8. The torque of the element 8 is in turn exerted upon the armature 21 through whatever mechanical advantage the armature 21 has upon the case 8. For a certain impressed potential upon the armature 21 the shaft 22 thereof will be held stationary and the current in leads 24 will just equal the torque of the case 8 as modified by the mechanical advantage. This will, therefore, hold the case 8 stationary and the full relative motion between the parts 4 and 8 will appear as the rotative speed of the shaft 3 driving the load 1. If, now, the potential impressed upon the armature 21 be increased above said fixed value, the armature 21 will begin to move forward and add its motion to the motion of the case 8, thereby increasing the speed of the shaft 3.

If, on the contrary, instead of increasing the impressed potential on the armature 21 the potential should be decreased, then the armature 21 would no longer hold the case 8 against rotation and the case 8 would begin to drive the armature 21 and a potential would be generated in the armature 21 which would be such as to transfer energy from the machine 16 to the machine 26, tending to drive the A. C. motor 28 above synchronism, thereby returning power in the form of alternating current of the same frequency as that impressed upon the line 17. In other words, the asynchronous connection which includes the machine 16 and the machine 26 transfers power from the case 8 back to the line 17 to produce, in effect, a circulating current whereby the power which is absorbed by the case 8 in securing a reduction of speed of the shaft 3 is regenerated.

Now, it can be seen that by reducing the excitation of the field 20 of machine 16 as by inserting resistance in the field circuit at the rheostat 36 the rate at which the armature 21 moves to secure the desired reaction with respect to the machine 26 will be changed. Hence, the rheostat 36 may be employed to change the range of the drive between different speed limits, so long as that range lies within the capacity of the equipment. There is, however, another and for certain purposes more important capability involved in the use of the rheostat 36 and that will now be explained in conjunction with Figure 3.

Assume that the load 1, which is a fan has a power curve as shown in curve B of Figure 3. Curve B shows the power required by the fan in percent, plotted against the speed in the fan, plotted in percent. Curve A shows the torque of the fan in percent, plotted against the speed of the fan, plotted in percent. To make up the power required by the fan, two components are involved, namely, the component supplied by the A. C. motor 5 which is indicated by the curve C and the power supplied through the stator or case 8 by the D. C. machine 16, which is shown in the curve D.

It will be observed that the power required by the fan drops off very rapidly as its speed decreases. Such a curve is encountered in centrifugal fans, pumps, ships' propellers, etc.

At 100% power requirement, that is, at full speed of the fan, a part of the power, as illustrated by the curve B, is supplied by the A. C. motor and a part of the power is supplied by the D. C. machine 16 driving through the stator or case 8. Both of these components are positive, that is, are additive in the same direction. As the speed of the fan is decreased to the mean speed, which is the proper speed of the A. C. motor 5, the power supplied through the D. C. machine 16 drops to zero and the whole load is carried by the A. C. motor. If, now, the speed is to be further reduced, the power required by the fan is less than the power which would be supplied by the A. C. motor running at its proper speed, and the D. C. machine 16 now is required to convert part of the relative motion at the prevailing torque into the regenerated electrical power aforesaid. If the torque remained constant, the capacity rating of the machine 16 would be quickly passed, in fact the range of variation which it could accomplish on the negative or speed reduction side would be no greater than it is on the positive or speed increase side. Hence, in order to secure a speed variation of a given percentage of the total speed, the rated capacity of the machine 16 and its regulating unit 27 would have to be, in percentage of the total power, numerically equal to one-half the percentage speed range. For example, on a load which has substantially constant torque throughout, if a speed range of 33⅓ per cent based on maximum speed of the load is desired, the amount of makeup power or takeoff power to be handled by the machine 16 is then 16⅔ per cent of the total power required by the load at maximum speed or possibly at minimum speed.

On loads such as a fan, centrifugal pump, or marine propulsion, where the torque decreases with the speed, the speed range may be carried further in the negative direction than in the positive direction without overloading the D. C. machine. The lower end of the speed range is extended beyond the limits of armature control by the rheostats 33 by field control of the machine 16 through the rheostat 36. On such a load, overspeed of the D. C. machine 16, or of the rotating frame 8, rather than overload, will generally establish the limit of speed reduction.

In one installation of drive units substantially of the form shown in Figures 1 and 2, at the plant of the Super-Power Company of Illinois, located at Powerton, near Peoria, Illinois, half of the units, each rated at 419 horse-power (330 H. P. induction motor 5 and 89 H. P. direct current motor 16) and capable of operating through a speed range of 100 per cent down to 40 per cent (1088 R. P. M. to 444 R. P. M.) drive induced draft fans. The other units, each rated at 166 horse-power (141 H. P. in the induction motor 5 and 25 H. P. in the D. C. machine 16) and capable of operating through a speed range of 100 per cent to 46 per cent (1004 R. P. M. to 468 R. P. M.) drive forced draft fans. In this application, each regulating unit 27 controls two drive units. The D. C. drive machines 16 and the regulating units 27 are standard apparatus taken directly from the manufacturer's list.

It will be seen from the curve of Figure 3, particularly the curve D that whereas the positive part of the curve includes substantially fourteen per cent of the total speed, the negative part of curve D covers approximately forty per cent of the total speed. Thus a total speed range of 54 per cent is available in this unit with a rated capacity of the machine 16 of only 14 per cent of the total power requirement.

In order to secure this form of control of the speed the controller 34 is preferably so constructed that through the positive part of the curve B and the corresponding negative part of the same the variation in speed is secured by armature control, that is, by variation of the rheostat 33—37, and thereafter the controller 34 operates the rheostat 36—38, to secure the remainder of the speed variation. Suitable means for sequential operation of the rheostat 33—36 are now known to those skilled in the art and I have not illustrated the same, as this element per se is not a part of the present invention.

Because of the rapid decrease in power required as the fan speed decreases, the power delivered to the D. C. machine 16 by the rotating frame 8 does not, in either the induced draft or the forced draft fan, exceed the power delivered by it at maximum fan speed. It will be observed from the curve D of Figure 3 that the height of the curve D below the X axis does not, throughout the range shown, reach the same value as the height of the curve D above the X axis. Hence, advantage can be taken of this characteristic to extend the speed control range to lower limits by weakening the field of the D. C. drive motor 16 through the rheostat 36. In the case of the induced draft fan the range in the negative direction is doubled by using field control and on the forced draft fan motors it is trebled.

While I have shown the A. C. main motor 5 as a squirrel-cage motor, and that is a preferred embodiment, the invention is not limited to the use of a squirrel-cage induction motor, but any A. C. motor which has substantially fixed speed characteristics and consequent high efficiency may be used in this drive.

I have prepared preliminary designs for units of much larger size employing a synchronous type A. C. motor rated at 3000 H. P. at 1800 R. P. M. The D. C. machine which cooperates with the same is rated at 150 H. P. to give a speed range of plus or minus five percent, that is, from 1890 to 1710 R. P. M. of the variable speed drive shaft.

It will be understood that where the extension of the speed range is secured by field control the H. P. rating of the regulating unit 27 for the D. C. machine 16 needs to be only normally equal to the rating of said machine 16. On loads which have substantially constant torque, where the percentage of speed range which may be secured is due entirely to armature control, the capacity of the regulating unit and of the D. C. machine 16 must be equal to the percent variation above or below the speed of the A. C. motor 5.

It is a characteristic of this system that if the load conditions should be such that the torque changes from positive to negative, the drive unit would first increase its speed slightly, then regenerate and deliver energy to the supply system. This characteristic has an application on hoists and elevators and in railway service. When used in railway service, in connection with multi-speed A. C. motors regeneration can be carried all the way down to zero speed.

Where constant, or substantially constant torque is encountered and a wider range of speed is desired, as, for example, in railway work, the A. C. motor 5 is preferably arranged to be operated selectively at two or more speeds, as disclosed in my copending application Serial No. 360,400, filed May 4, 1929. For such electric traction purposes the multiple belt-drive, as shown in Figures 1 and 2, is highly desirable because of the quietness and it avoids the necessity for an oil-tight casing which, particularly with the rotating frame or case 8, is objectionable.

It will be observed that the rotating case 8 is connected in differential relation between the load and the D. C. drive motor. The drive of the D. C. auxiliary machine, 16, is exerted through the torque between the case 8 and the rotor 4.

I do not intend to be limited to the details shown and described except as the same are recited in the appended claims.

I claim:—

1. In combination, a source of alternating current, a load shaft, an alternating current motor connected to said source of alternating current, said motor being of constant speed type and having two elements both mounted for independent rotation, the load shaft being connected to one of said elements, a direct current machine of adjustable speed type having an armature shaft substantially parallel to the axis of the rotatable elements of the alternating current motor, reversible power translating means for translating alternating current into direct current and vice versa connected between said source of alternating current and said direct current machine, a controller governing the translating means for governing the direction of flow of power between said translating means and said direct current machine and thereby controlling the operation of the direct current machine as a motor or as a generator, grooved sheaves for the direct current machine and the other element of the alternating current machine, and a plurality of V belts connecting said sheaves, said V belts transmitting to the direct current machine the torque of the alternating current motor at standstill or for motion in either direction.

2. In combination, a source of alternating current, a load shaft, a separately excited direct current motor having a drive shaft, an alternating current motor operated from said source of alternating current, said alternating current motor being of constant speed type and being connected in differential relation between said direct current motor driving shaft and said load shaft, said connection comprising a pair of grooved sheaves and multiple V belts in said grooves connecting said sheaves, means for controlling the speed and direction of motion of the direct current motor comprising a direct current generator operated at a constant speed by an alternating current motor connected to the alternating current supply line, said generator having a separately excited field and an armature which is connected in series with the armature of the direct current motor and a controller for governing the direction and amount of excitation of the field of the direct current generator to control the interchange of power between the direct current generator and the direct current motor for adjusting the speed of the load shaft.

In witness whereof, I hereunto subscribe my name this 11th day of April, 1930.

ALLEN M. ROSSMAN.